United States Patent [19]
Hirsh et al.

[11] Patent Number: 5,844,759
[45] Date of Patent: Dec. 1, 1998

[54] ELECTRICAL FAULT INTERRUPTER

[75] Inventors: Stanley S. Hirsh, El Passo, Tex.; David C. Nemir, 1221 Baltimore, El Paso, Tex. 79902

[73] Assignee: David C. Nemir, El Paso, Tex.

[21] Appl. No.: 653,943

[22] Filed: May 22, 1996

Related U.S. Application Data

[63] Continuation-in-part of Ser. No. 453,664, May 26, 1995.

[51] Int. Cl.$^6$ .................................................. H02H 3/00
[52] U.S. Cl. .............................. 361/42; 361/49; 361/103
[58] Field of Search ................................ 361/42, 45, 49, 361/103, 64

[56] References Cited

U.S. PATENT DOCUMENTS

| | | | |
|---|---|---|---|
| 2,061,347 | 11/1936 | Coe | 177/311 |
| 3,252,052 | 5/1966 | Nash | 317/18 |
| 3,313,960 | 4/1967 | Borys | 307/127 |
| 3,600,635 | 8/1971 | Neilson | 317/33 SC |
| 3,806,845 | 4/1974 | Zubaty | 335/18 |
| 3,872,355 | 3/1975 | Klein et al. | 361/45 |
| 3,936,699 | 2/1976 | Adams | 317/18 D |
| 3,970,975 | 7/1976 | Gryctko | 335/18 |
| 3,997,818 | 12/1976 | Bodkin | 317/33 SC |
| 4,029,996 | 6/1977 | Miffitt | 307/326 |
| 4,031,431 | 6/1977 | Gross | 307/326 |
| 4,040,117 | 8/1977 | Houser | 361/33 |
| 4,042,967 | 8/1977 | Yamamoto | 361/45 |
| 4,091,434 | 5/1978 | Suzuki | 361/100 |
| 4,216,515 | 8/1980 | Van Zeeland | 361/45 |
| 4,347,540 | 8/1982 | Gray et al. | 361/47 |
| 4,353,103 | 10/1982 | Whitlow | 361/45 |
| 4,464,582 | 8/1984 | Aragaki | 307/118 |
| 4,520,417 | 5/1985 | Frank | 361/45 |
| 4,577,094 | 3/1986 | Mills | 219/505 |
| 4,639,817 | 1/1987 | Cooper et al. | 361/62 |
| 4,649,454 | 3/1987 | Winterton | 361/50 |
| 4,658,322 | 4/1987 | Rivera | 361/37 |
| 4,707,759 | 11/1987 | Bodkin | 361/48 |
| 4,734,843 | 3/1988 | Beddoe et al. | 363/50 |
| 4,751,603 | 6/1988 | Kwan | 361/42 |
| 4,763,365 | 8/1988 | Gerondale et al. | 4/542 |
| 4,797,772 | 1/1989 | Kaplanis | 361/42 |
| 4,802,052 | 1/1989 | Brant et al. | 361/42 |
| 4,829,390 | 5/1989 | Simon | 361/49 |
| 4,843,514 | 6/1989 | Bodkin | 361/50 |
| 4,853,822 | 8/1989 | Kamijo | 361/100 |
| 4,858,054 | 8/1989 | Franklin | 361/57 |
| 4,860,147 | 8/1989 | Fai | 361/50 |
| 4,878,144 | 10/1989 | Nebon | 361/96 |
| 4,903,162 | 2/1990 | Kopelman | 361/103 |
| 4,912,588 | 3/1990 | Thome | 361/45 |
| 4,931,893 | 6/1990 | Glennon | 361/45 |
| 4,931,894 | 6/1990 | Legatti | 361/45 |
| 4,954,922 | 9/1990 | Gaus et al. | 361/42 |
| 4,979,070 | 12/1990 | Bodlkin | 361/42 |
| 5,047,724 | 9/1991 | Boksiner et al. | 324/520 |
| 5,109,315 | 4/1992 | Morse | 361/42 |
| 5,124,646 | 6/1992 | Nachtigall | 361/42 |
| 5,148,344 | 9/1992 | Raol et al. | 361/42 |

(List continued on next page.)

*Primary Examiner*—Jeffrey A. Gaffin
*Assistant Examiner*—Michael J. Sherry
*Attorney, Agent, or Firm*—Jeffrey D. Myers; Deborah A. Peacock

[57] ABSTRACT

An apparatus and method for the avoidance of electrical shock in an electrical appliance. Preferred for a two wire appliance, the device consists of a current interrupting circuit that impedes current flow for short time intervals in each half cycle. If a fault to ground occurs during these short time intervals, an increased current flow through the plug is detected and this is recognized as a fault, causing a circuit interrupter to open and removing current from the load during the remainder of the half cycle. When the fault is removed, that event is detected within one half cycle and power is restored to the load. The apparatus can provide thermal control in the plug. The apparatus enables the use of a low current, low voltage switch to control high voltages and high currents in the appliance. The apparatus can transmit fault status information or other information to a remotely located controller and can receive control signals from that remotely located controller.

28 Claims, 11 Drawing Sheets

U.S. PATENT DOCUMENTS

| | | | |
|---|---|---|---|
| 5,159,517 | 10/1992 | Bodkin | 361/49 |
| 5,166,853 | 11/1992 | Gershen et al. | 361/50 |
| 5,184,271 | 2/1993 | Doyle | 361/49 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,200,873 | 4/1993 | Glennon | 361/45 |
| 5,206,595 | 4/1993 | Wiggins et al. | 324/535 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,280,404 | 1/1994 | Ragsdale | 361/113 |
| 5,301,083 | 4/1994 | Grass et al. | 361/64 |
| 5,353,185 | 10/1994 | Bodkin | 361/49 |
| 5,394,289 | 2/1995 | Yao et al. | 361/43 |
| 5,420,740 | 5/1995 | MacKenzie et al. | 361/45 |
| 5,477,412 | 12/1995 | Neiger et al. | 361/45 |

# ELECTRICAL FAULT INTERRUPTER

CROSS REFERENCE TO RELATED APPLICATIONS

This application is a continuation in part application of U.S. patent application Ser. No. 08/453,664, entitled "Electrical Fault Interrupt with Frayed Cord Protection", to Stanley S. Hirsh and David C. Nemir, filed on May 26, 1995, the teachings of which are incorporated herein by reference.

BACKGROUND OF THE INVENTION

1. Field of the Invention

This invention relates to shock protection circuits for electrical appliances and more particularly, to an improved protection device that can detect and eliminate ground faults, has an automatic reset upon the removal of the fault, and can also serve as a means for bidirectional communication and control between the appliance and a remote computer.

2. Background of the Invention

Any electrical device ("the load") requires the flow of electrical current in order to operate. An analogy is the flow of water through an aquarium filter. A pump takes in water from the aquarium and increases the pressure (analogous to an increase in electrical voltage) to force the water through a tube (the tube is analogous to the electrical conductor or wire) to the filter (analogous to the electrical load). The flow of water current through the tube is analogous to the flow of electrical current in a wire. Most of the water pressure is "used up" in passing through the filter so that the water coming out of the filter has a relatively low pressure. A hose conveys the low pressure water from the filter outlet back to the aquarium. If the tube connecting the pump and the filter has a hole then some of the water will pass through this hole from the high pressure in the tube to a lower pressure outside the tube. This constitutes a water leak.

In somewhat the same way, an electrical device or load receives electrical energy from one terminal of an electrical outlet or source (the so-called high voltage or "hot" side), electrical current flows to the device through an electrical conductor or wire (the hot conductor), this current passes through the load and is then returned to another terminal of the electrical outlet through another wire called the neutral wire. The neutral wire will have a very low voltage (electrical pressure) because most of the voltage will be "used up" in the act of forcing electrical current through the load.

The two wires that connect source and load may have a coating of rubber or some other electrical insulating material or they may be bare, in which case air, which is a good insulator, functions to inhibit electrical current flow outside of the wire. Since the human body can conduct the flow of electrical current, if a person comes into contact with one electrified object such as the hot conductor, while also making contact with a second object having a substantially different voltage, then an electrical leakage current that is proportional to the voltage difference will flow through the person and may cause injury or death. If the second object that the person comes in contact with is electrically connected to the earth (ground) then this is called a ground fault. If the person makes contact between the neutral wire and ground this is called a neutral to ground fault. Since the voltage difference between neutral and ground is generally small (because the neutral line is connected to ground at a breaker box), a neutral to ground fault is generally considered to be less hazardous than a hot to ground or a hot to neutral fault. However, if the neutral line is not connected to ground at a breaker box, or if the neutral and hot lines are misconnected, a neutral to ground fault can be as dangerous as a hot to ground fault.

Electrical current is the flow of electrons. Since electrons are not created or destroyed, any functioning electrical appliance will require both an entry path and an exit path in order for electrical current to flow. In an electrical appliance, electrons may exclusively enter on one path and exit on a second (direct current or DC operation). This is analogous to the aquarium leak example. For most household appliances that operate from a plug, electrons will sometimes enter path one and exit path two and sometimes enter path two and exit path one. This is known as alternating current or AC operation. A special case of AC operation is the so-called half wave AC (also known as pulsating DC) whereby over regularly repeating periods of time (or cycles), electrical current will flow in one direction for a portion of the cycle and will be blocked from flowing for another portion of the cycle. Although the direction of current flow in half wave AC operation is unidirectional, it is considered to be alternating current since the magnitude of the electrical current varies in a cyclical fashion.

Although the two conductors coming out of an electrical circuit are called "hot" and "neutral", in an AC system, the hot conductor will cyclically have a more positive voltage than the neutral for half the time and will have a more negative voltage than neutral for half the time, having a momentary value of zero as the voltage passes from positive to negative and negative to positive.

A common source of electrical injuries in the home occurs when people place radios or similar electrical devices that are operated using household AC electrical current near their pool or bath tub while swimming or bathing. If the radio is knocked into the water, it can create electrical leakage current through the water to ground. A ground fault can also occur when a person touches an electrically hot conductor while standing on or touching a grounded conductive surface. When sufficient current passes through a person, electrical burns or electrocution may result. Many electrical appliances such as heaters, hair dryers, electric razors and pumps are used near water and present this type of hazard.

The U.S. Consumer Product Safety Commission compiles annual estimates of injuries in the U.S. due to consumer products. For the year 1993, this organization estimates that there were over 8200 injuries due to electrical shock and over 8900 additional injuries due to electrical burns. The products in which these injuries occur are grouped in such diverse categories as extension cords (an estimated 129 shock and 481 electric burn injuries), power drills (an estimated 17 shock injuries) aquarium accessories (an estimated 112 shock injuries), Christmas tree lights (an estimated 69 shock and 34 electrical burn injuries) and hair dryers (an estimated 103 shock and 491 electrical burn injuries).

A device called an immersion detection circuit interrupter (IDCI) detects the occurrence of electrical leakage due to water immersion and opens a circuit breaker, indirectly providing protection against a potential ground fault that would occur, for example, by dropping an IDCI equipped hair dryer into a bathtub. Such immersion protection devices are described in U.S. Pat. Nos. 5,159,517 (Bodkin) 4,797, 772 (Kaplanis) and 5,184,271 (Doyle and Rivera). They do not directly provide ground fault protection as they require immersion in water to operate.

Protection circuits for ground faults, commonly known as ground fault interrupters or GFI's, are presently required by code for the bathrooms of most new homes and commercial buildings. Such circuits are also required for Underwriter's Laboratories approval in hair dryers and are built into the plug of U.L. approved hair dryers. Of the GFI circuits presently available on the market, all use a current imbalance in a current sense transformer as the means of detecting a fault. Such circuits are described, for example, in U.S. Pat. Nos. 4,216,515 (Van Zeeland), 4,353,103 (Whitlow), 4,979,070 (Bodkin) and 5,200,873 (Glennon).

3. Objects and Advantages

The present invention has the following objects and advantages:

a) requires only a two wire electrical cord connecting the appliance to the plug;

b) does not require a current sense transformer;

c) interrupts power to the appliance in less than one half cycle from the occurrence of the fault;

d) electrical power is automatically restored to the device upon removal of the fault (auto-reset);

e) can detect and respond to a hot to ground fault;

f) can detect and respond to a hot to AC neutral fault;

g) can detect and respond to an appliance neutral to AC neutral fault;

h) can detect and respond to an appliance neutral to ground fault;

i) can detect and prevent an overtemperature condition at the plug;

j) its all solid state design (no current sense transformer, no moving parts) allows it to be built into a small, conventionally sized plug;

k) can be used to control power to the appliance using a low current, low voltage switch located at the plug;

l) appliance can be turned on or off in response to a command signal broadcast over the household wiring;

m) the appliance can identify itself or pass status information to a central controller via the household wiring; and n) the appliance can use a simple two pronged non-polarized plug.

Further objects and advantages of the present invention will become apparent from a description of the drawings and ensuing description. None of the prior art patents described in section 2, either alone or in any appropriate combination, anticipates or renders the disclosed invention unpatentable.

SUMMARY OF THE INVENTION

The present invention comprises a circuit interrupter for use in an alternating current (AC) electrical system having one hot and one neutral connection (a two wire appliance). Although additional wires could be present, for example, adding a ground wire to make a three wire cord, in most applications extra wires would be superfluous and would add unwanted additional cost. It is the principle objective of the invention to provide protection against a ground fault anywhere in the load or in the conductors connecting the plug and the load. It is another objective to provide protection against an overtemperature condition in the plug. It is another objective to provide a low current, low voltage switch in the plug that can control power to the load. It is another objective to provide a means to communicate bidirectionally from the appliance to a controlling device via the household wiring and to thereby communicate status information and control signals.

The objectives of this invention are obtained by using a fault sense/current interrupt circuit at the plug. The plug receives a sinusoidal alternating current (AC current) from a power delivery source or electrical outlet. Under normal operation, the interrupt circuit prevents all but a small sense current from flowing in the load during a short time interval around the zero crossing of the applied AC current cycle. If, during this time interval when the interrupt circuit is blocking load current, a ground fault occurs, electrical current will flow at the plug due to the sensing current flowing through the fault. This will be detected by the fault sense circuitry in the plug, which will maintain the interrupt circuit in an open condition, thus preventing appliance operation and preventing dangerous levels of electrical current from being applied to the fault. In each subsequent zero crossing of the AC cycle, the appliance and cord will be tested briefly to establish if a fault condition is still present. If a fault condition is still present, the current interrupt remains open. If the fault condition is no longer present, the current interrupt is closed and full electrical energy is delivered to the appliance. In this way, the device is self resetting.

In addition to fault protection, this invention will also provide temperature control at the plug. This is done by using a temperature dependent resistance or other thermally sensitive element in the plug in such a way that when it reaches a sufficiently elevated temperature, it causes the circuit interrupter mechanism at the plug to open, preventing load current from flowing through the plug and thereby allowing the plug to cool for a half cycle or one or more full cycles. If on subsequent cycles, the thermally sensitive element remains too hot, the circuit interrupter remains open. This feature is important in order to keep the current interrupter from being damaged in the case of a persisting overcurrent condition. When the overtemperature condition is ended, and assuming that no fault exists, electrical current is allowed to flow to the load.

An additional feature offered by this invention is the ability to control possibly high voltage, high current power to the appliance by using a low voltage, low current switch in the plug. Additional features include the ability to control the appliance under remote command from a controller that communicates over the household wiring. This is a feature that is important in implementing so-called "smart appliances". Smart appliances are appliances that can be controlled either internally or remotely without direct human intervention. A related idea is the so-called "Smart House" which is the prototypical home of the future. A number of protocols for the smart house have been established by U.S. and foreign manufacturers including the so-called Consumer Electronics Bus or CEBus. The smart house has a central computer that manages the functioning of all household appliances via a modified wall socket. In order to manage a given appliance, however, this central computer has to be able to identify what appliance is plugged into which socket. At a minimum, smart appliances will need the ability to identify themselves to the smart house via the household wiring. This is easily implemented as a byproduct of the circuit operation of the present invention. If a ground fault interrupt circuit attached to an appliance has detected a fault condition, this represents an event that might be important to communicate back to a central controller. In addition, other types of status information could be transmitted to a remotely located controller over the, for example, household wiring. In addition, control signals could be passed to the appliance over the household wiring. An ON/OFF function, for example, could be easily implemented by adding or removing a simulated fault condition within the plug, thereby shutting off or turning on appliance power. The present invention incorporates the ability for this type of communication and control.

The present invention is unique in that it uses an all solid state (electronic) design to do a job that has been traditionally done by mechanical relays and differential sense transformers. As such, it has the potential to be implemented almost entirely on a single integrated circuit. Silicon, the building block of integrated circuits, is cheap, and features such as control functions and signal conditioning can be added in silicon at little additional cost. This is particularly important from the standpoint of the smart appliance. Not enough smart houses are in existence in 1996 to justify a major investment by appliance manufacturers to make their appliances "smart house ready". However, with the availability of solid state fault protection where bidirectional communication and control features can be added at little additional cost, it becomes economically feasible to invest in solid state fault protection for the near term, while building in features that will make the appliances smart-house-ready in the future.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS

Figure 1:
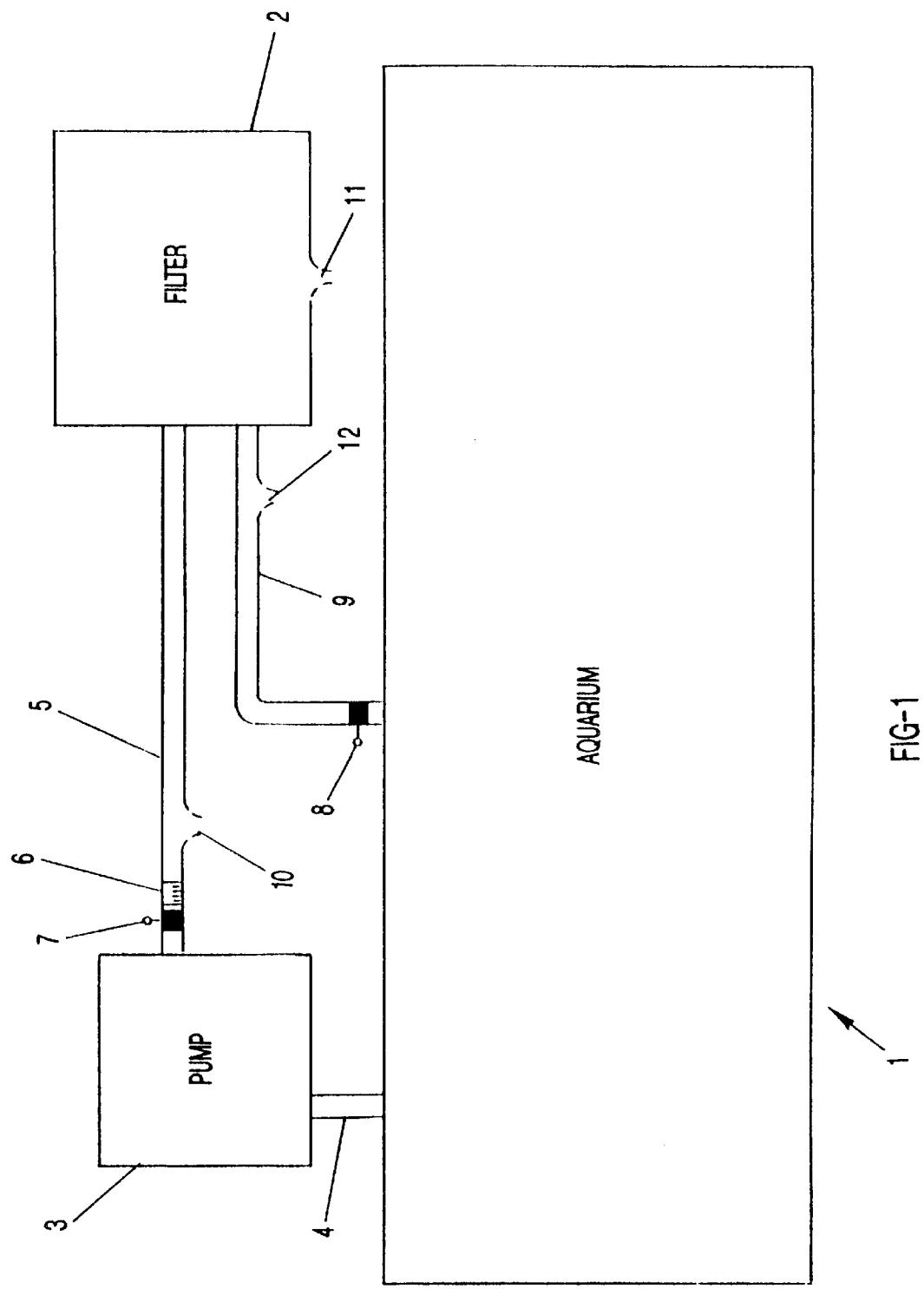
FIG. 1 depicts an aquarium pump/filter system which is analogous to the situation of sourcing electrical current to a load and furthermore depicting various analogs of electrical faults.

In order to describe the functioning of the present invention, it is helpful to look at the analogous situation of an aquarium pump and filter combination. FIG. 1 depicts a situation where water is pumped from the aquarium 1 through a filter 2 and is then returned to the aquarium 1. The pump 3 takes low pressure water from the aquarium 1 using a hose 4 and increases the pressure so that the water flows in the high pressure hose 5 from the pump 3 to the filter 2 through the pump outlet valve 7 and the flowmeter 6. The pump outlet valve 7 controls the flow of water out of the pump 3. The aquarium inlet valve 8, serves to allow or to block water flow into the aquarium 1. Both valves 7 and 8 have only two possible positions, fully open or fully closed. Leaks 10,11,12 can occur in a number of places within the system, resulting in water flowing in undesirable paths (faults) instead of through the hoses and filter.

Consider the flowmeter 6 installed at the outlet of the pump. This flowmeter 6 detects if any water is passing from the pump 3 into the high pressure hose 5. If pump outlet valve 7 is in an open position and aquarium inlet valve 8 is in a closed position, then in the absence of leaks 10, 11 and 12 there will be no flow of water out of the pump 3 and the flowmeter 6 will not detect any flow of water. If, however, there are leaks 10 and/or 11 and/or 12 then there will be some water flowing out of the pump 3 into the high pressure hose 5 and this event can be detected by the flowmeter 6. If this occurs, then the leaks 10 and/or 11 and/or 12 may be halted by closing the pump outlet valve 7. In this way, the flowmeter 6 together with the aquarium inlet valve 8 serve to detect the presence of leaks 10 and/or 11 and/or 12. Once a leak is detected, the pump outlet valve 7 can be closed to stop the leaks by interrupting the flow of water to the high pressure hose 5.

The water leakage scenario described above is helpful in understanding the functioning of the present invention for the protection against shocks and burns due to electrical current leakage in an electrical appliance. The key feature of this invention is that the majority of electrical current in the load is intentionally blocked from flowing during a portion of each half cycle. During this portion of each cycle when current flow to the load is inhibited except for possibly a low level sensing current, if any electrically conductive path is present between the hot wire and ground, then electrical current will flow out of the plug due to this conductive path and this "fault" current may or may not pass through the load. This represents a fault condition and is sensed at the plug which maintains the open circuit to prevent substantial current from flowing out of the plug.

Figure 2:
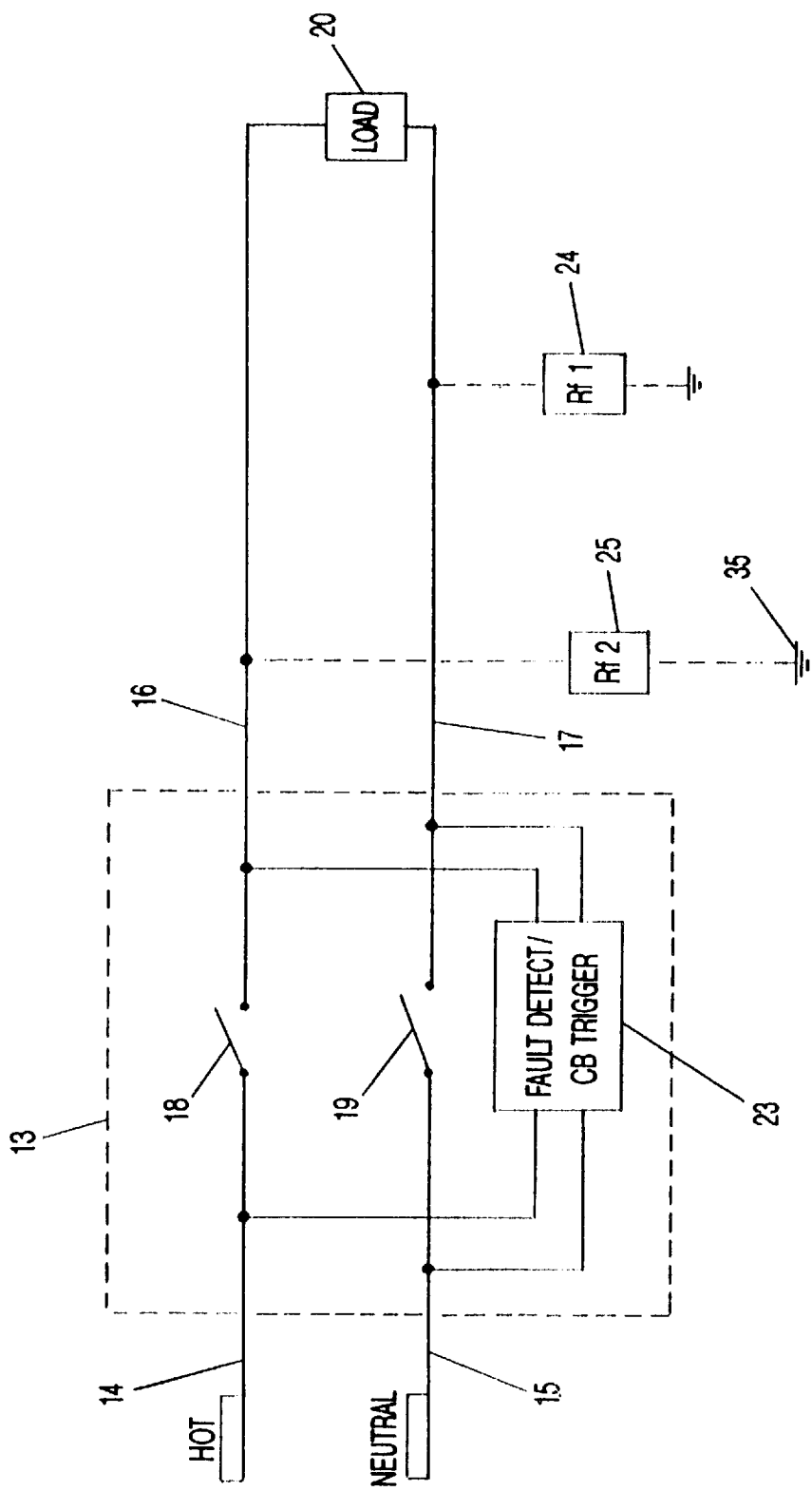
FIG. 2 is a block diagram of the invention, illustrating the approximate connections of fault sensing circuitry and circuit breakers within the plug/cord/appliance unit.

FIG. 2 depicts a block diagram of this approach to fault detection/protection. The plug 13 connects to the hot 14 and neutral 15 prongs. The hot 14 and neutral 15 prongs are the blades of metal seen on any conventional electrical appliance plug. The plug 13 also connects to the hot side 16 of the line cord and neutral side 17 of the line cord. Switch 18 is located between prong 14 and conductor 16. Switch 19 is located between prong 15 and conductor 17. These switches 18 and 19 are used to allow (when closed) or interrupt (when open) the current flow to the load 20.

The load 20 represents any conventional electrical appliance load and could be, for example, a hair dryer, an aquarium heater, a curling iron, or a string of lights. A fault 25 from the hot conductor 16 to ground 35 or a fault 24 from the neutral conductor 17 to ground 35 consists of an unintentional path for electrical current to travel and represents, for example, a human coming in contact with an exposed wire while standing on a grounded surface. In order to detect a fault, switches 18 and 19 will be opened at the same time with the fault detect/circuit breaker trigger 23 providing a limited current path around switch 18 and switch 19, through which fault current could be sensed. At any time that a fault 24 or 25 exists, this condition will be detected by the fault detect/circuit breaker trigger 23 which then causes switches 18 and/or 19 to maintain an open position which will be maintained as long as faults 24 and/or 25 exist.

Accordingly, if the neutral to ground fault 24 or hot to ground fault 25 represents a human body making accidental contact with dangerous voltages then this invention will protect against electrical injury by detecting this as a fault condition and will prevent substantial current from flowing from the plug, thereby implementing shock protection.

Figure 3:
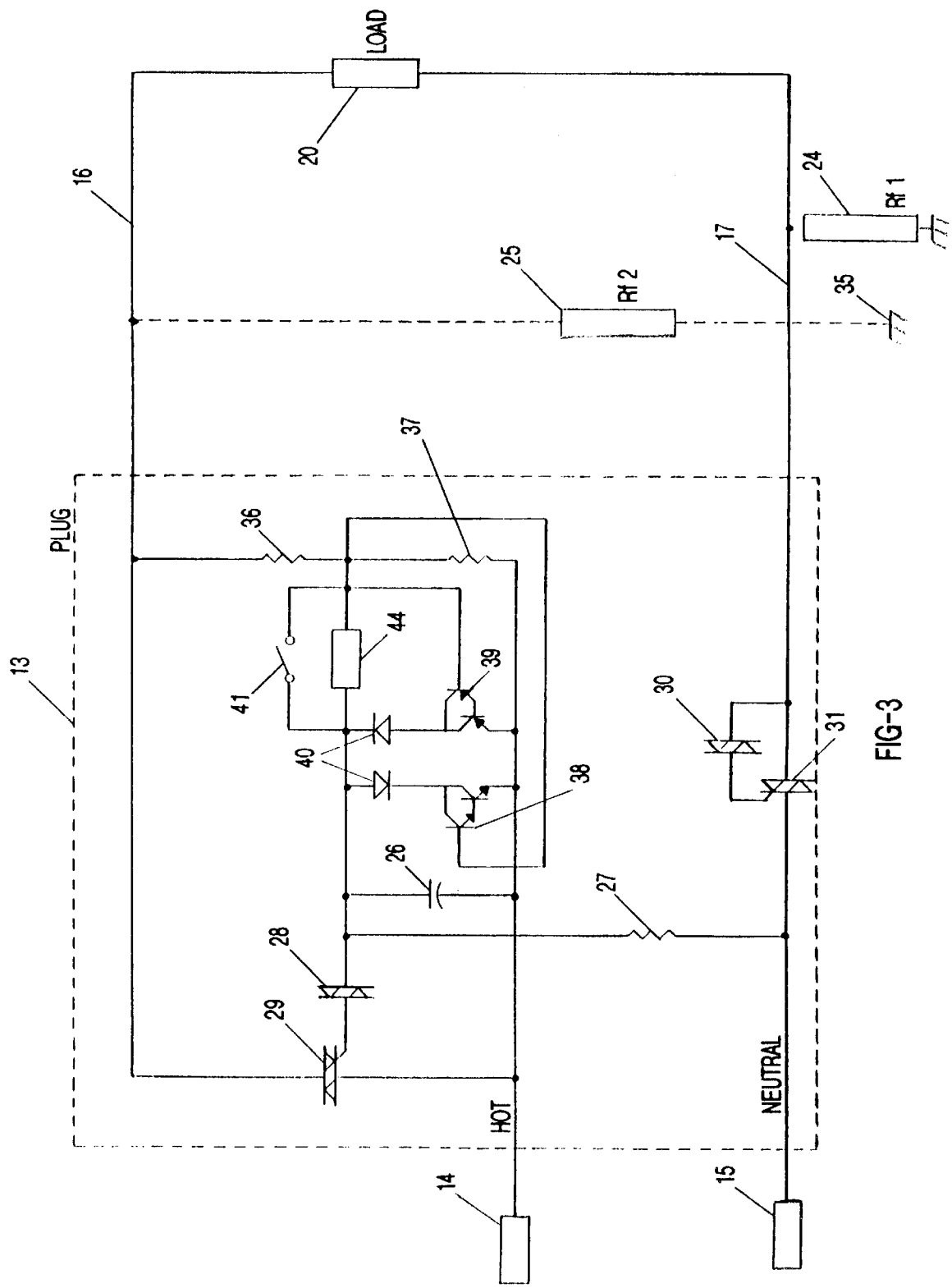
FIG. 3 is an electrical schematic of the first embodiment of this invention using a two-prong plug and able to detect a fault to ground from the hot side of the line cord, from the load, or from the neutral side of the line cord and to respond appropriately.
Figure 4:
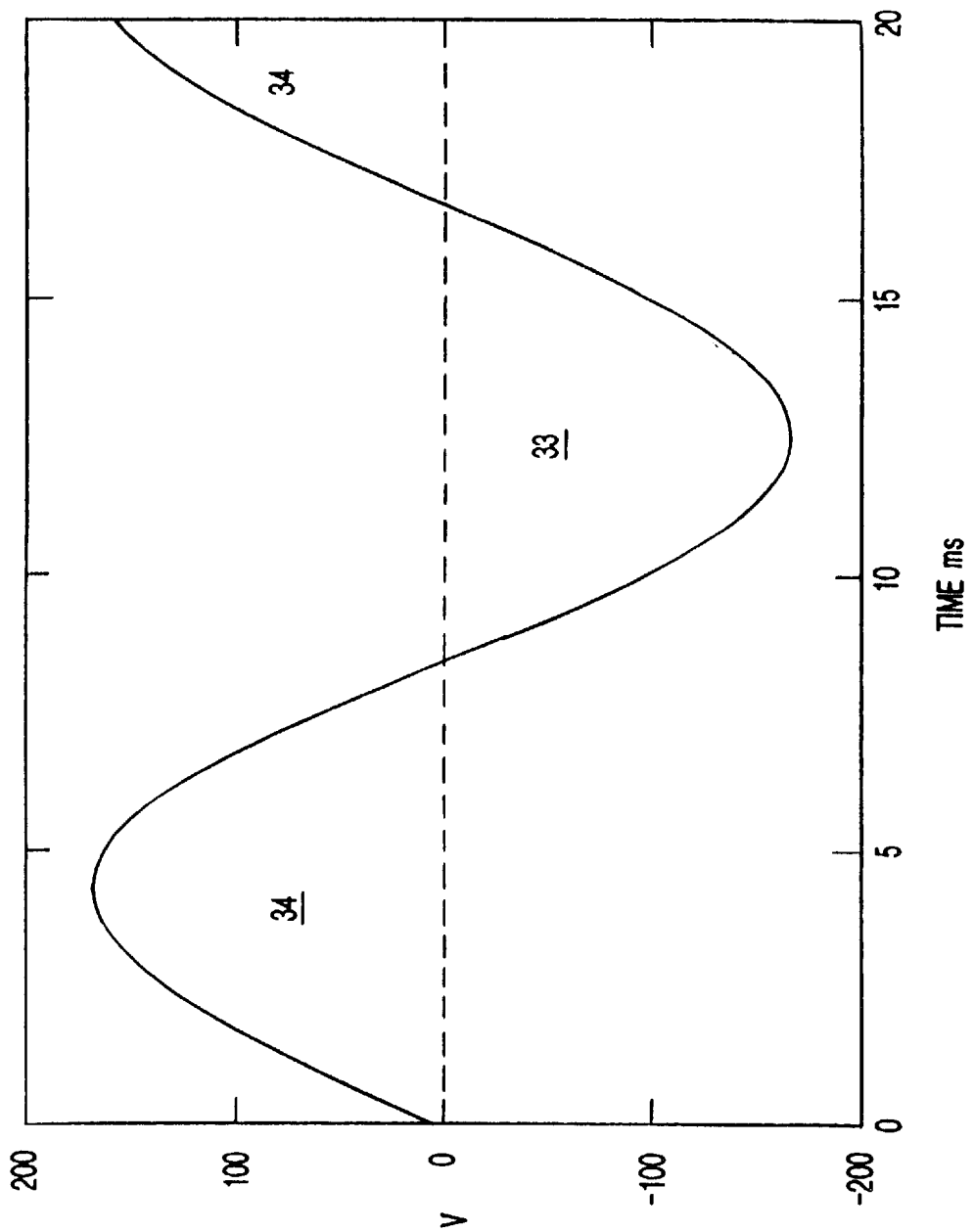
FIG. 4 is a sketch of approximately one and one fourth cycles of the AC voltage applied at the plug on the hot prong with respect to the neutral prong.

The first preferred embodiment is shown in FIG. 3. The power applied to the plug prongs 14 and 15 is sinusoidal alternating (AC) current. FIG. 4 depicts approximately 1 and ¼ cycle of this AC voltage at the hot prong 14 relative to the neutral prong 15. The negative half cycle 33 is defined as the time interval during each cycle of AC when the voltage at the hot prong 14 has a value that is negative with respect to the neutral prong 15. For example, FIG. 4 depicts a waveform corresponding to 60 cycles per second (a period of 16.66 milliseconds). In FIG. 4, the first 8.33 milliseconds corresponds to the positive half cycle 34 while the interval going from 8.33 milliseconds to 16.66 milliseconds corresponds to a negative half cycle 33. This then repeats.

In the absence of a fault, during the negative half cycle 33 a charge storage capacitor 26 in the plug 13 is positively charged through resistor 27. When the voltage on capacitor 26 exceeds the diac 28 turn-on voltage, the diac 28 fires, triggering hot side triac 29. Although FIG. 3 shows a diac 28, it could be replaced by an equivalent element that serves to block current flow through the element until a voltage threshold or time interval is reached and then conducts current when that voltage threshold or time interval is exceeded. Hot side triac 29 then turns on and allows electrical current to flow through the plug to the load 20 through the hot conductor 16. In the absence of a fault, during the positive half cycle 34 the charge storage capacitor 26 in the plug 13 is negatively charged through resistor 27. When the voltage on this capacitor exceeds in magnitude the diac 28 turn-on voltage, the diac 28 fires, triggering hot side triac 29. Hot side triac 29 then turns on and allows electrical current to flow in the plug 13 to the load 20.

Figure 5:
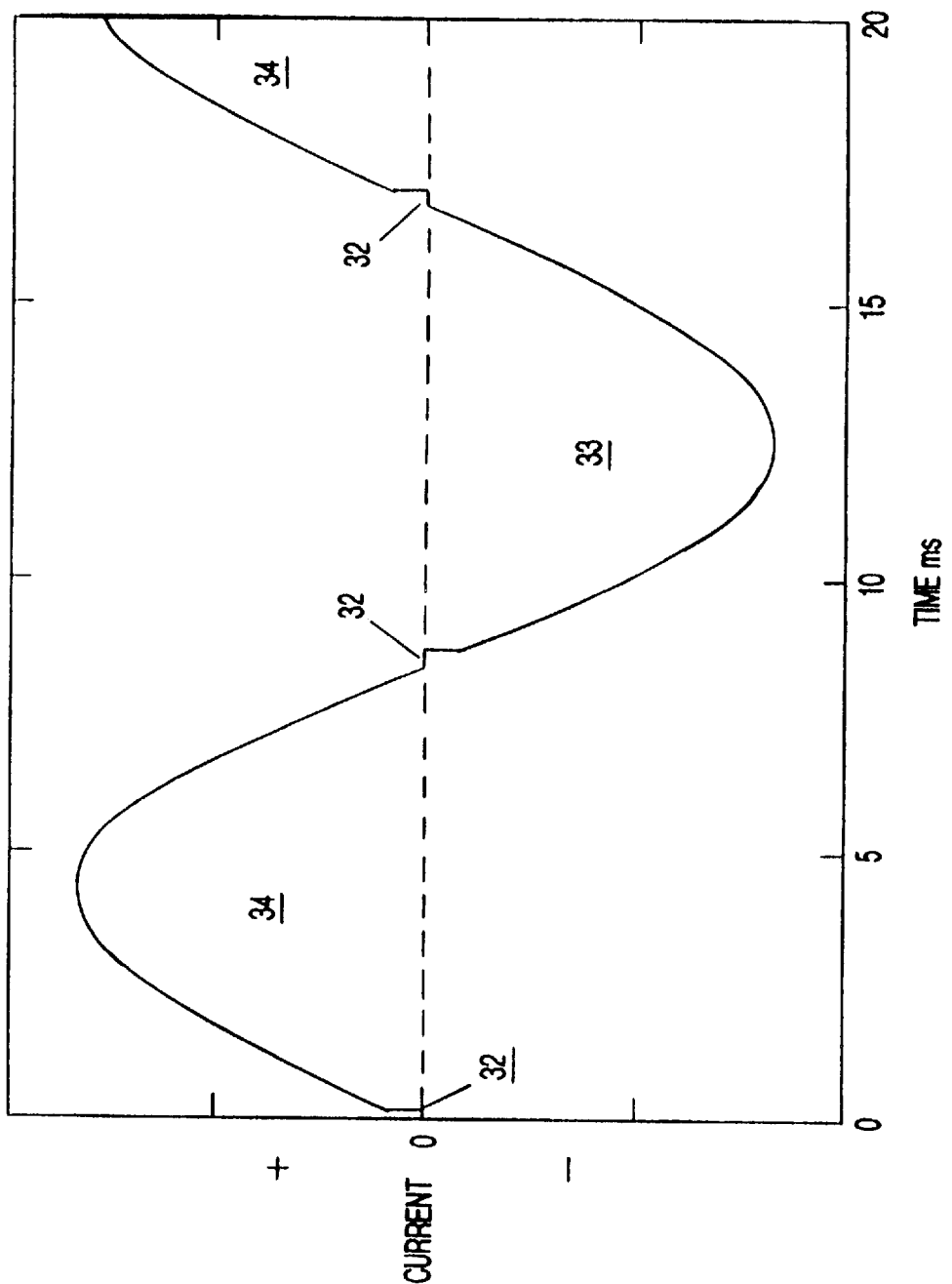
FIG. 5 is a sketch of the windows wherein all but a small sense current is inhibited from flowing within the load.

In this embodiment, the neutral side switching is handled by triac 31 and diac 30. During the portion of the AC cycle in which the magnitude of the voltage between conductor 17 and the neutral prong 15 is less than the diac 30 trigger voltage, the neutral side triac 31 will be inhibited from conducting and no electrical current will be delivered to the load 20 through the neutral side triac 31. FIG. 5 depicts the electrical current delivered to the load 20 in the absence of a fault. The intervals 32 are the times during which the current is blocked from flowing in the load 20 due to triacs 29 and 31 being unfired and representing open switches. During these intervals, a small current may still flow out of the plug through the series connection of resistors 36 and 37 if a fault 24 and/or 25 is present. Resistors 36 and 37 would typically be chosen to be of high value to minimize this sense current. If fault 24 and/or 25 is present during time interval 32 at the beginning of the negative half cycle, transistor 38 in the plug 13 will conduct through its collector diode 40 due to base current generated by the fault current flowing through a resistor divider 36,37. Transistor 38 will discharge the capacitor 26 preventing diac 28 from firing the triac 29. Hot side triac 29 will thus remain off for the rest of the negative half cycle 33. During the time interval 32, prior to the positive half cycle 34 of the input power, if fault 24 and/or 25 is present, transistor 39 will conduct through its collector diode 40 due to base current generated by the fault current flowing through resistor divider 36,37. Transistor 39 will discharge capacitor 26, preventing diac 28 from firing. Hot side triac 29 will thus remain off for the remainder of the positive half cycle. Because hot side triac 29 is prevented from firing, current flow through the plug is prevented. Whenever a fault is detected, whether at the beginning of a positive half cycle 34 or a negative half cycle 33, triac 29 functions as a current interrupter. After interval 32 is over, and during the remainder of the positive half cycle, the current flowing through the fault resistances 24 and/or 25 will keep either transistor 38 or 39 in a conducting mode thus preventing capacitor 26 from charging enough to fire diac 28 to subsequently trigger triac 29.

When neither fault 24 nor fault 25 is present, the capacitor 26 will be allowed to charge through resistor 27. By doing so, the capacitor 26 and diac 28 will enable the power triac 29 to conduct current to the load 20 on subsequent half cycles, in this way serving to automatically reset the load within one half cycle from the removal of the fault. The neutral triac 31 and diac 30 serve to remain open during the time intervals 32 around zero crossing. In this way they serve to distinguish the legitimate load 20 from a fault load 24 and/or 25.

To summarize, if no fault is present the load will receive power during both the positive and the negative half cycles. At any time that a fault 24 and/or 25 occurs, it will be recognized at the beginning of the next occurring half cycle during time interval 32 and all power (except for perhaps a low level test current) will be shut off to the appliance for the remainder of that half cycle. Accordingly, fault detection occurs within one half cycle of the occurrence of a fault and power is removed from the load and the faults within one half cycle of the occurrence of the fault. This fast fault detection/protection and equally fast reset upon fault removal is an important feature of the present invention.

In FIG. 3 an optional temperature dependent element 44 may be used to shut off current flow through the plug if operating temperatures in the plug become excessive. The temperature dependent element could be, for example, a negative temperature coefficient resistor (a so-called NTC thermistor) that decreases in resistance as the temperature is increased. Under nominal operating temperatures the temperature dependent element 44 has a sufficiently high resistance that negligible current flows through it from capacitor 26 to the bases of transistors 38 and 39 and so element 44 has no impact on the circuit operation. If, however, element 44 has a reduced resistance due to a high temperature then the current flow from capacitor 26 to the bases of the transistors 38 and 39 is appreciable, causing one of the transistors to conduct and thereby discharging capacitor 26 and preventing it from firing diac 28 to turn on triac 29. The effect would be to turn off power through the plug 13 whenever the plug 13 gets too hot, thereby allowing the plug to cool.

For some applications it might be important to turn off power at the plug when the plug became too cool, in which case temperature dependent element 44 could be a so-called positive temperature coefficient (PTC) thermistor that increases in resistance as temperature is increased and would function in an inverse manner to the NTC thermistor in that appliance power delivery would be inhibited for cool temperatures.

In FIG. 3 an optional switch 41 may be used to implement a low power ON/OFF switch at the plug. When the switch is closed, it furnishes current to the bases of the transistors 38 and 39, causing them to discharge capacitor 26 and thereby causing the hot side triac 29 to interrupt current flow to the load 20. The advantage to controlling appliance power in this way is that switch 41 can have a current and voltage rating much lower than the rating of the load.

Figure 6:
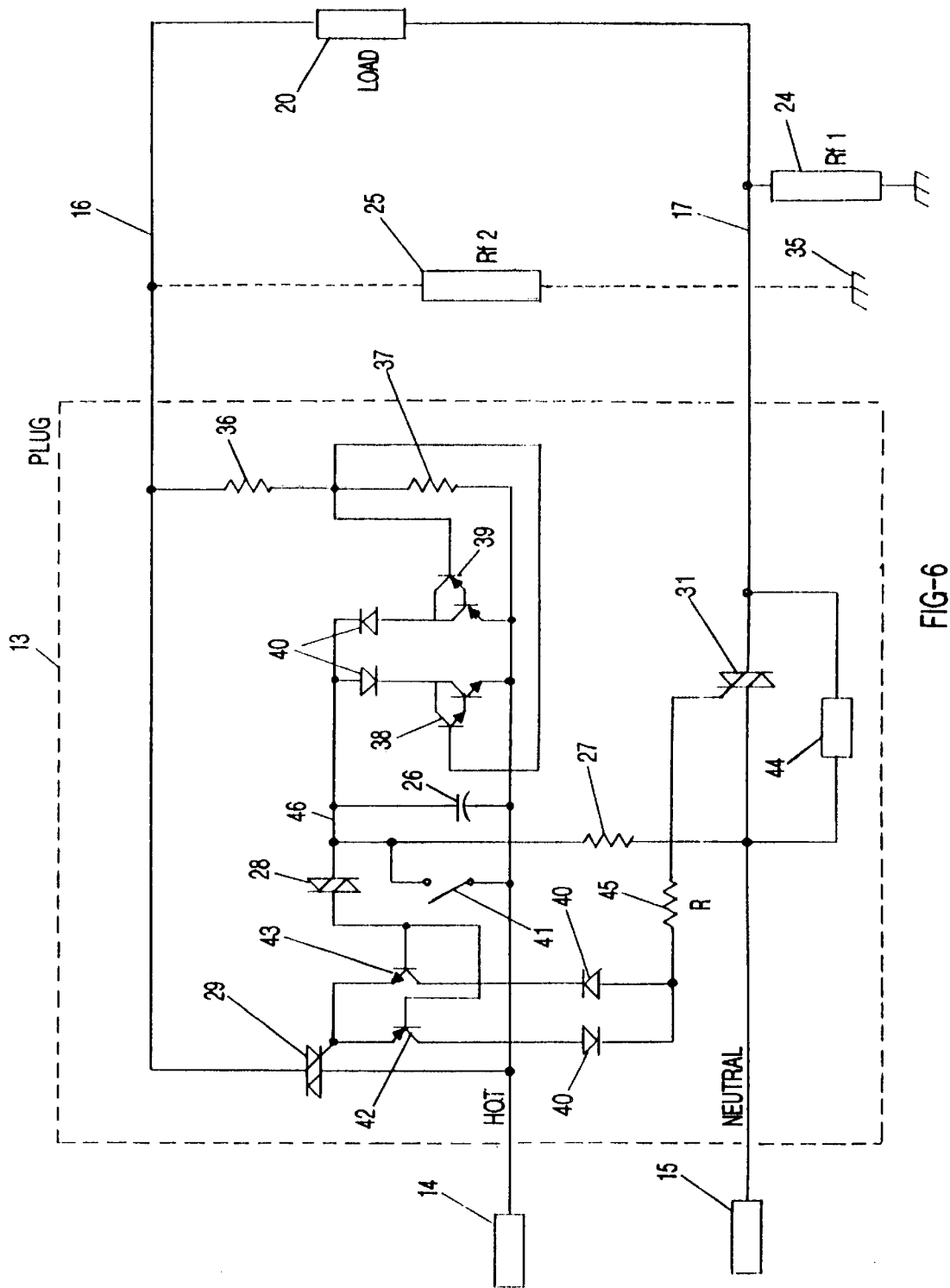
FIG. 6 is an electrical schematic of a second embodiment of this invention wherein circuit interruption occurs at both the hot side of the line as well as the neutral side of the line upon the detection of a fault condition.

A second preferred embodiment is shown in FIG. 6. It functions in a similar manner to the first preferred embodiment with the primary difference being that the neutral triac 31 is now turned on at the same time as the hot triac 29. In this way, both triacs 29 and 31 function to block the current during time intervals when checking for a fault and both triacs function to inhibit current flow to the load and faults when a fault is detected.

At the beginning of every half cycle, hot triac 29 and neutral triac 31 are open and in the absence of a fault, the only path for electrical current to flow out of the plug is from the hot prong 14 through resistors 36 and 37, through the load 20 and through temperature sensing element 44. Under normal operating conditions (no fault), the temperature sensing element 44 will have a relatively high electrical impedance and very little current will flow out of the plug. During the negative half cycle (33 on FIG. 5) diac 28 blocks the flow of current until the voltage at node 46 at one end of diac 28 exceeds a diac threshold voltage. When this occurs, the diac 28 fires, allowing current to pass through it, and turning on the NPN transistor 43 which then turns on the hot triac 29 and the neutral side triac 31. This neutral side triac is turned on due to current provided through the gate of triac 29 via resistor 45 and steering diodes 40. Current can then flow to the load for the remainder of the negative half cycle. In a similar way, when no fault is present, during the positive half cycle, diac 28 blocks current flow until the magnitude of the voltage at node 46 exceeds the diac turn-on voltage. When that happens, the diac conducts, turning on the PNP transistor 42 which turns on the hot side triac 29 and the neutral side triac 31.

At the beginning of the negative half cycle 33, if faults 24 and/or 25 of sufficiently low resistance are present, a significant leakage current will flow from ground 35 through fault 24 in series with load 20 and/or through fault 25, then through resistor 36 and 37 to the hot prong 14. If the fault is sufficiently severe (that is, sufficiently low in value), enough electrical current will flow so that the voltage developed across resistor 37 will exceed the turn-on voltage of the NPN Darlington transistor 38, causing it to turn on and effectively causing the diac node 46 to have a voltage magnitude lower than the diac 28 turn on voltage with respect to the hot prong 14. As a result, diac 28 will not fire and will thus not allow triacs 29 and 31 to turn on.

At the beginning of the positive half cycle 34, if faults 24 and/or 25 of sufficiently low resistance are present, a significant leakage current will flow from the hot prong 14 through resistors 37 and 36 and through the the load 20 and fault 24 to ground 35, and/or through the fault 25 to ground 35. When the voltage across resistor 37 exceeds the turn-on voltage of the PNP Darlington transistor 39, the PNP Darlington will turn on, causing the diac node 46 to have a very low magnitude voltage with respect to the hot prong 14. As a result, diac 28 will not fire and will thus not allow triacs 29 and 31 to turn on.

If no fault is present the load will receive power during both the positive and the negative half cycles. At any time that a fault 24 and/or 25 occurs, it will be recognized at the beginning of the next occurring half cycle and load power will remain off for that half cycle. Accordingly, fault detection occurs within one half cycle of the occurrence of a fault and power is removed from the load and the faults within one half cycle of the occurrence of the fault. This fast fault detection/protection is an important feature of the present invention. The relatively small fault sense current is not controlled by triacs 29 and 31 but will be limited by resistors 36 and 37 to a small, safe value.

In FIG. 6 an optional temperature dependent element 44 may be used to shut off current flow through the plug if operating temperatures become excessive. The temperature dependent element could be, for example, a negative temperature coefficient resistor (a so-called NTC thermistor) that decreases in resistance as the temperature is increased. Under nominal operating temperatures the temperature dependent element 44 has a sufficiently high resistance that negligible current flows through it and so element 44 has no impact on the circuit operation. If, however, element 44 has a reduced resistance due to a high temperature then during the time interval 32 when triacs 29 and 31 are turned off, there will be a significant current flow through the sensing element 44 and to the load 20 and resistors 36 and 37 to the hot prong 14. The effect will be the same as that of a fault current. Either transistor 38 or 39 will be turned on (depending on which half cycle), inhibiting diac 28 from firing and preventing triacs 29 and 31 from being turned on during the remainder of the half cycle. The plug then is allowed to cool for the remainder of the half cycle.

In FIG. 6 an optional switch 41 may be used to implement a low power ON/OFF switch at the plug. When the switch is closed, it prevents diac 28 from ever receiving a sufficiently high magnitude voltage at node 46 to turn on, forcing triacs 29 and 31 to remain off. The advantage to controlling appliance power in this way is that switch 41 can have a current and voltage rating much lower than the current and voltage rating of the load itself.

Figure 7:
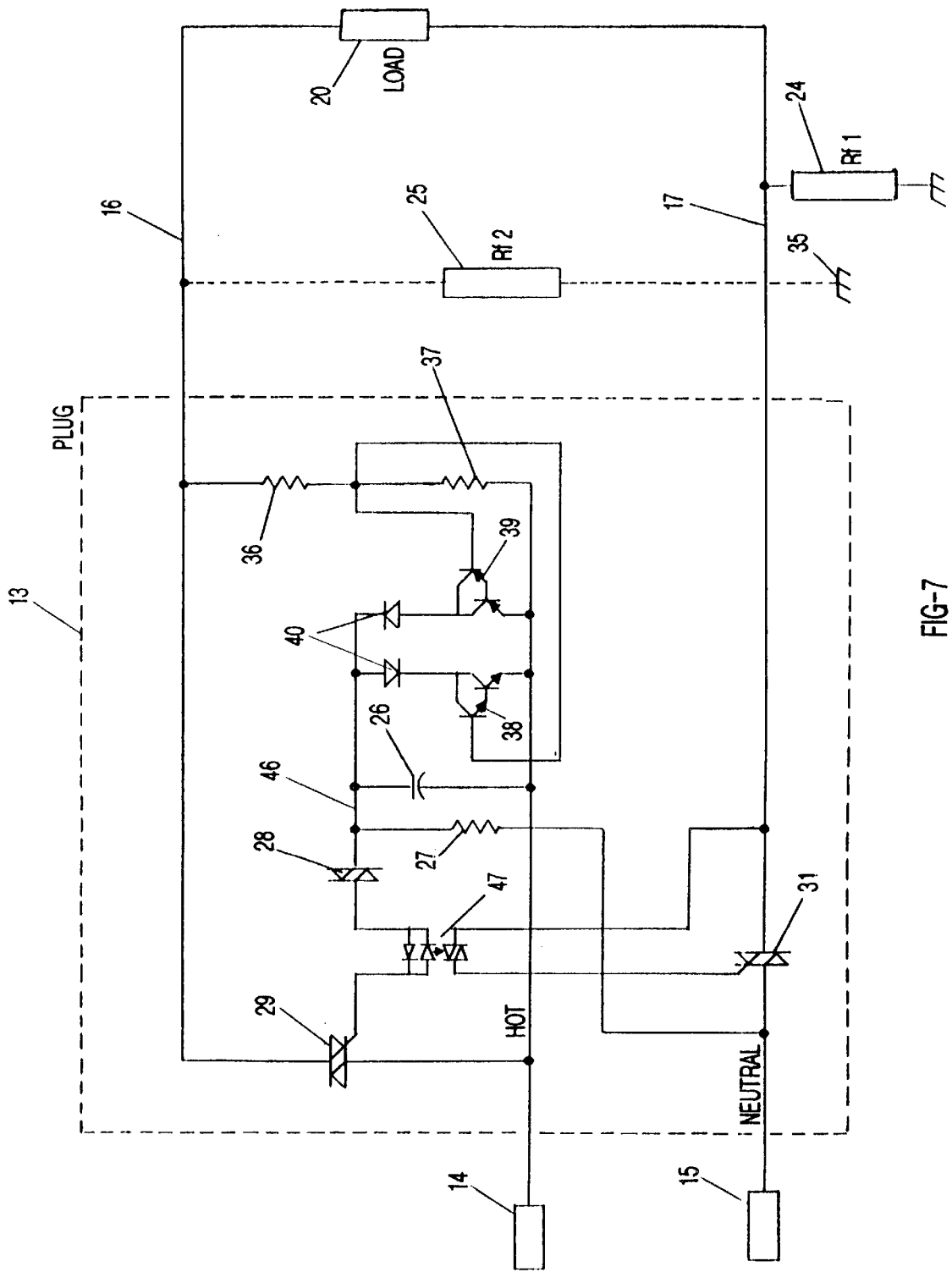
FIG. 7 is an electrical schematic of a third embodiment of this invention wherein current interruption occurs at both hot and neutral sides of the line and which utilizes optocoupling to control the neutral side circuit interrupter.

A third specific embodiment is shown in FIG. 7 wherein a photo triac driver 47 is used to control the neutral triac 31 simultaneously with the hot triac 29. The functioning of the circuit is almost identical to that of the second specific embodiment (FIG. 6) in the detection of a fault condition and the conditions under which diac 28 is fired or is prevented from firing. In the third specific embodiment, when diac 28 is fired, it provides gate current to the hot triac 29 through the AC controlled photo triac driver 47 and thereby turns on triac 29. At the same time, by means of an optical signal transmitted from the light emitting diode side of the photo triac driver 47 to the light activated triac side. The light activated triac side of the photo triac driver 47 triggers the neutral triac 31.

Figure 8:
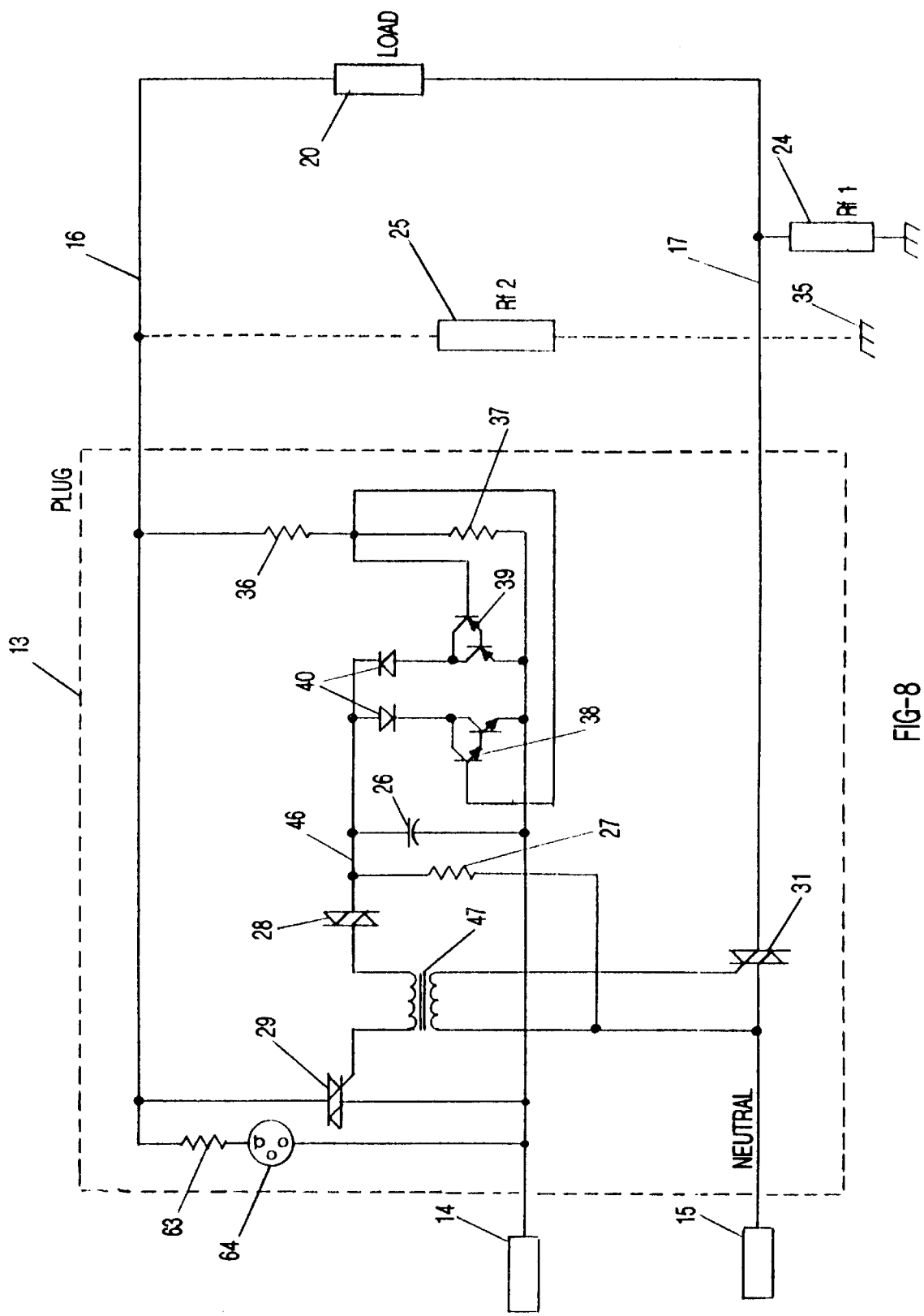
FIG. 8 is an electrical schematic of a fourth embodiment of this invention wherein current interruption occurs at both hot and neutral sides of the line and which utilizes a pulse transformer to control the neutral side circuit interrupter.

A fourth specific embodiment is shown in FIG. 8. This circuit uses a pulse transformer 48 to trigger the neutral triac 31 at the same time that the hot triac 29 is triggered. The pulse transformer 48 is triggered by a pulse of current from capacitor 26 through diac 28 and the gate of triac 29 whenever current is to be allowed to flow out of the plug. Fault sensing is accomplished as with earlier described embodiments. This embodiment depicts a neon indicator light 64 which together with a limiting resistor 63 is in parallel across the hot side triac 29. During the time intervals 32 when the triac is turned off, or at any time when the triac 29 is turned on, there is an insufficient voltage across the triac to turn on the neon 64. If, however, triac 29 is turned off over one or more full half cycles, a sufficient voltage is built up across it to turn on the neon light, thus giving a visual indication of a fault condition. Current limiting resistor 63 is a very high value resistance that would limit to safe levels the amount of current that could flow through the neon in a path around triac 29 in the case of a fault condition.

Figure 9:
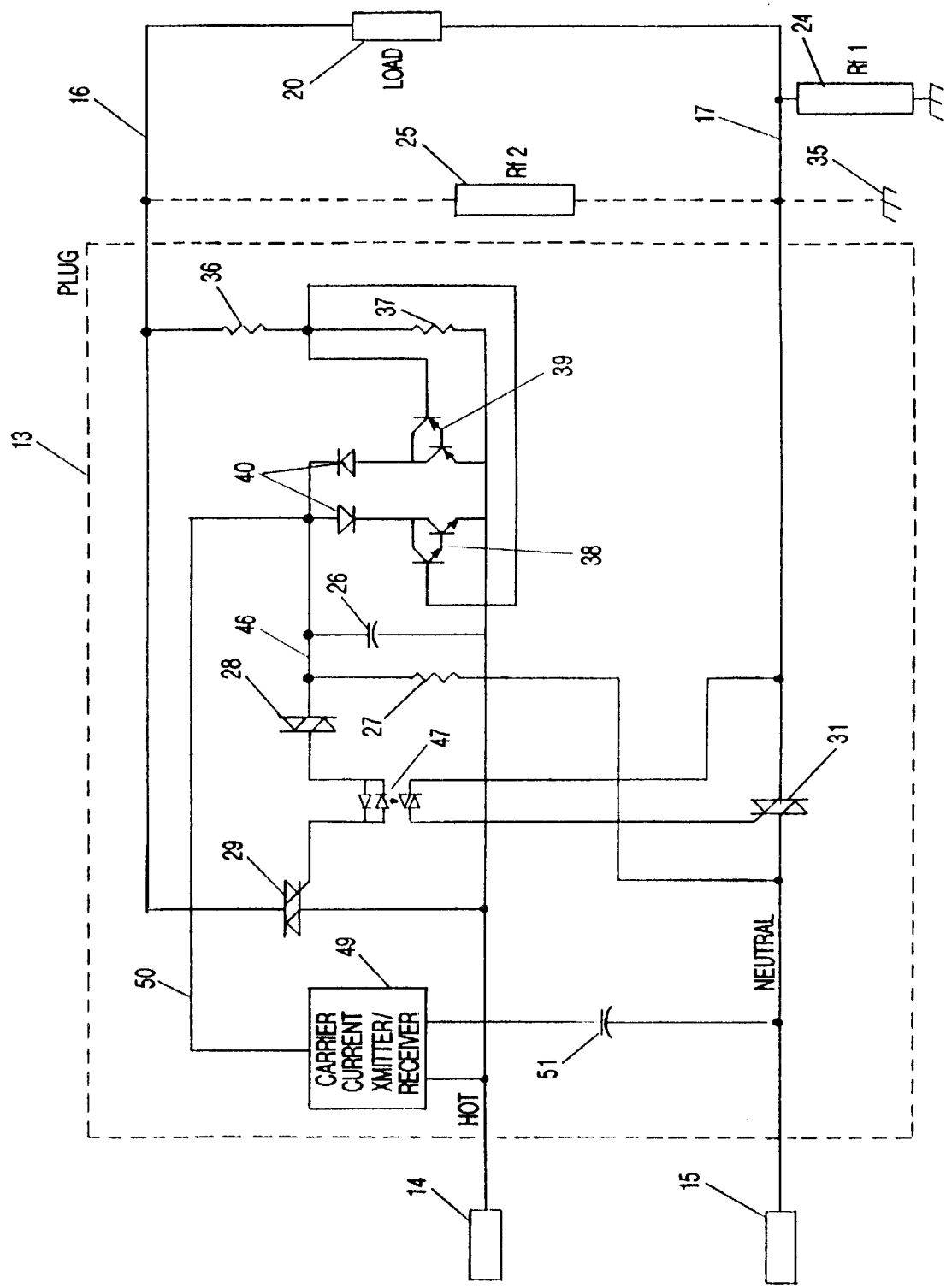
FIG. 9 is an electrical schematic of a fifth embodiment of this invention which provides fault detection/protection and also incorporates a carrier current transmitter/receiver to either receive commands from a remotely located controller via carrier currents on the household wiring and/or can communicate fault, identification or other status information back to that controller.

A fifth specific embodiment is shown in FIG. 9. This embodiment contains the features of the third embodiment except that a carrier current transmitter has been added with direct electrical connection to the hot prong 14, a direct electrical connection to node 46 and a capacitive coupling to the neutral prong 15. The carrier current transmitter can communicate bidirectionally with a remote computer controller over the AC line. This is done by using radio frequency carrier currents which travel along the household wiring. This communication could be used, for example, to alert the remote computer system that a fault had been sensed in the appliance. This information would come from monitoring node 46. Additional information that could be sent to a remote location might include a characteristic code that would identify what type of appliance the plug is connected to as well as information about the operating status of the device such as temperature, etc. In addition, the remote computer system could send a signal to tell the appliance to turn off, in which case the carrier current transmitter/receiver module 49 would prevent capacitor 26 from charging by providing a discharge path from node 46 to the hot prong 14, thus preventing the diac 28 from firing and thus preventing triacs 29 and 31 from turning on.

Figure 10:
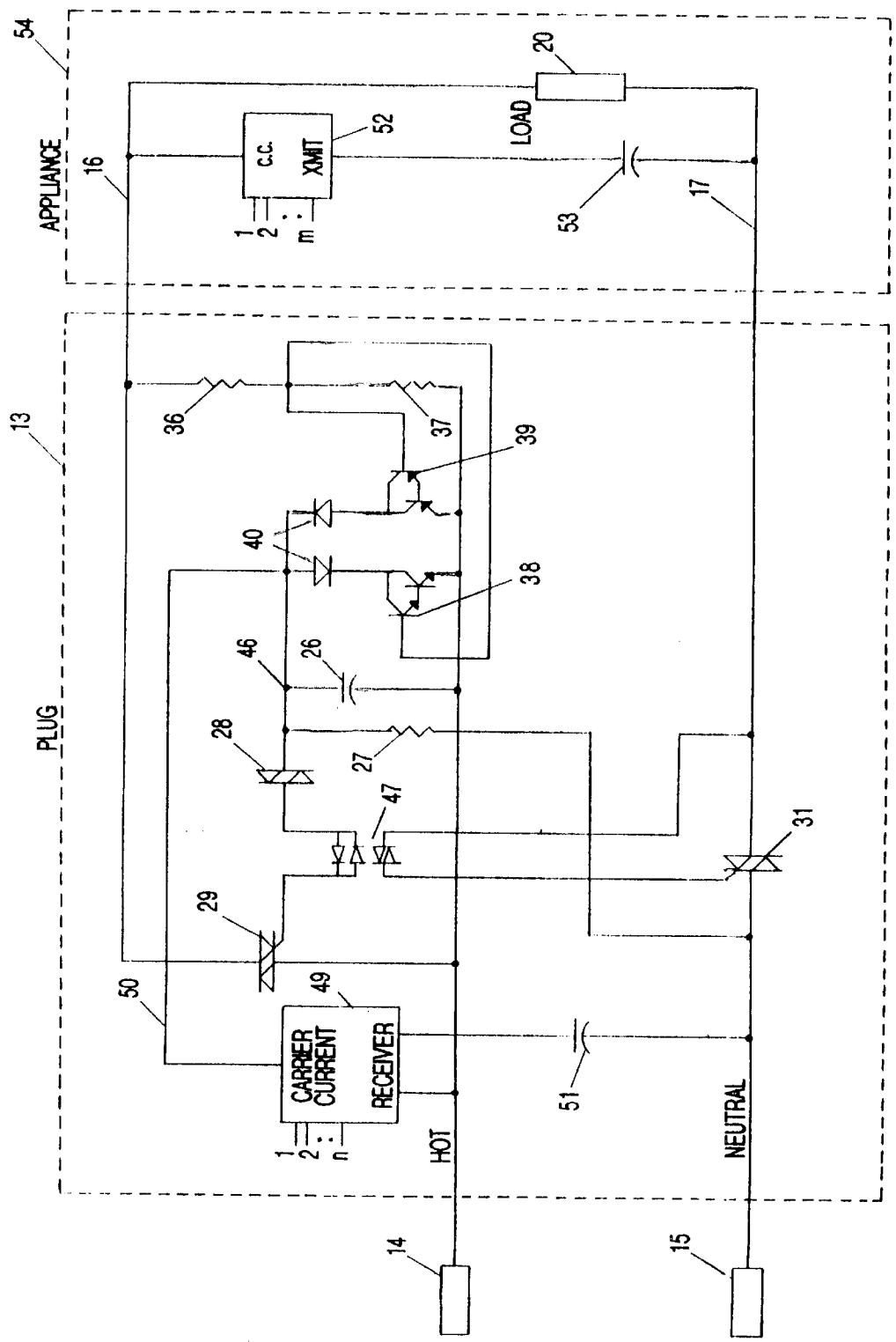
FIG. 10 is an electrical schematic of a sixth embodiment of this invention which provides fault detection/protection and also incorporates a carrier current transmitter/receiver in the plug and at the load to transmit status and control information bidirectionally between plug and load and to transmit status and control information bidirectionally over the household wiring between the plug and a remotely located controller.

A sixth specific embodiment is shown in FIG. 10. This embodiment utilizes carrier currents to transmit information bidirectionally between plug and load over the two conductors 16 and 17 connecting the plug to the load. The appliance 54 is depicted as consisting of a load 20 and a carrier current transmitter 52. The carrier current transmitter 52 is connected to neutral through a coupling/power capacitor 53. The carrier current transmitter 52 can accept an arbitrary number of inputs from one or more sensors within the appliance and can encode that information for transmission on the two wires 16 and 17 connecting the plug 13 to the appliance 54. Sensory information is received by the carrier current transmitter/receiver 49 which can use that information to control the power to the appliance over control line 50. The carrier current transmitter/receiver 49 can also accept an arbitrary number of inputs from one or more sensors within the plug 13. The carrier current transmitter/receiver can also encode the sensory information gathered within the plug, as well as sensory information received from the appliance 54, and can transmit that information to a central computer over the household wiring. As in the fifth embodiment, the transmitter/receiver can receive control signals from the remote household controller and shut off appliance power by controlling line 50.

Figure 11:
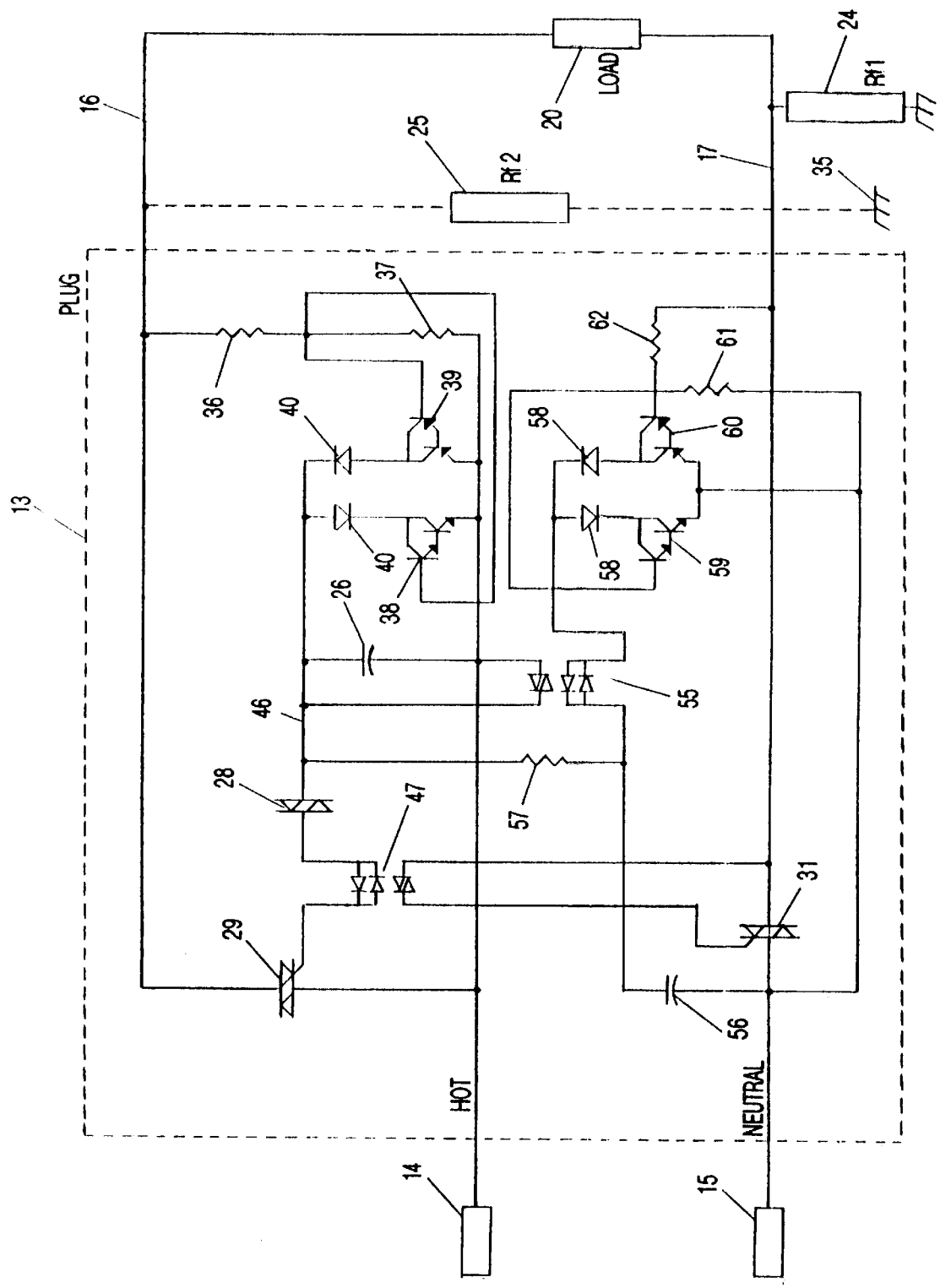
FIG. 11 is an electrical schematic of a seventh embodiment of this invention which provides fault detection/protection and which further provides an equivalent level of fault protection regardless of the polarity of the plug.

A seventh specific embodiment is depicted in FIG. 11. This embodiment is very much like the third specific embodiment (FIG. 7) except that it is designed to work with a nonpolarized plug, that is, it will detect a ground fault even if the hot and neutral prongs are swapped. The upper half of the circuit operates in an identical fashion to the previous (FIG. 7) embodiment when the plug prong 14 is actually plugged into the hot side of the source and the plug prong 15 is plugged into the neutral side of the source. The only difference in operation from the third embodiment is that resistor 57 is used to charge capacitor 26. The path for charging is from the neutral 15 through capacitor 56 through resistor 57. Capacitor 56 is charged at the same time as capacitor 26. As discussed when describing the third specific embodiment, in the absence of a fault, during each half cycle when capacitor 26 charges to a voltage magnitude sufficient to fire diac 28, it will turn on triac 29 and, through the photo triac driver 47, will turn on triac 31, and both triacs 29 and 31 will conduct electrical current for the balance of the half cycle. When a fault 24 and/or 25 occurs, it serves to cause a sufficiently high voltage at the bases of Darlington transistors 38 and 39 to cause them to turn on, which in turn causes capacitor 26 to discharge so that the diac 28 voltage does not reach its turn on voltage and triacs 29 and 31 are not turned on.

If the hot and neutral prongs are swapped, then in the absence of a fault, the circuit functions as described above with capacitor 26 charging to a voltage magnitude sufficient to trigger diac 28 on each half cycle, in turn triggering triacs 29 and 31 and allowing current to flow to the load. If a fault 24 and/or 25 is present at the beginning of a given half cycle, then the bottom half of the circuit becomes active. Now a fault current flows through the path from prong 15 (which is now the hot prong) through resistors 61 and 62 through fault resistors 24 and/or 25 to ground. If the fault impedance 24 and/or 25 is sufficiently low in value then an appreciable current will flow at the beginning of the half cycle and a voltage will be generated at the base of Darlington transistors 59 and 60 which will be sufficient in magnitude to trigger one of these transistors, causing capacitor 56 to discharge through an LED on the photo triac driver 55 thus turning on the triac in the photo triac driver 55. When this triac turns on it discharges capacitor 26, preventing it from charging to a sufficiently high voltage to turn on diac 28. Since diac 28 is not fired, triac 29 remains in an off condition and triac 31 remains off and no current is supplied to the load for the balance of the half cycle.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. An electrical shock protection apparatus for an alternating current electrical appliance comprising an electrical load and two electrical current carrying conductors connecting said electrical load to a power source;

said electrical shock protection apparatus comprising:

means for bidirectionally blocking electrical current flow through said two electrical current carrying conductors to said electrical load for predetermined time intervals;

means for detecting electrical current flow in said two electrical current carrying conductors; and means for interrupting electrical current flow in said two electrical current carrying conductors if an appreciable current in one of said two conductors is detected during said predetermined time intervals, said appreciable current being indicative of a potentially dangerous electrical fault.

2. The electrical shock protection apparatus of claim 1 wherein said bidirectional electrical current blocking means, said electrical current flow detecting means and said electrical current flow interrupting means are all disposed within a plug.

3. The electrical shock protection apparatus of claim 2 wherein said bidirectional electrical current blocking means permits said detecting means to detect a fault selected from the group consisting of load to ground faults and of hot to ground faults and neutral to ground faults in an electrical current carrying conductor.

4. The electrical shock protection apparatus of claim 2 wherein said plug is non-polarized.

5. The electrical shock protection apparatus of claim 1 additionally comprising a low current switch means that can shut off flow of current to said electrical load by imposing an artificial fault condition.

6. The electrical shock protection apparatus of claim 1 additionally comprising means for said shock protection apparatus to communicate to a remote controller information selected from the group consisting of presence of a fault condition, absence of a fault condition, appliance identification information, and appliance status information.

7. The electrical shock protection apparatus of claim 1 wherein said bidirectional electrical current blocking means is selected from the group consisting of diac controlled thyristors, transformer coupled thyristors, transistor controlled thyristors and optocoupled thyristors.

8. The electrical shock protection apparatus of claim 1 wherein said bidirectional electrical current blocking means prevents electrical current flow when a magnitude of voltage of said power source is below a predetermined threshold and wherein said bidirectional electrical current blocking means triggers to allow electrical current flow when the magnitude of voltage of said power source exceeds said threshold.

9. The electrical shock protection apparatus of claim 1 wherein said alternating current electrical appliance consists essentially of an electrical load and two electrical current carrying conductors connecting said electrical load to a power source.

10. The electrical shock protection apparatus of claim 9 wherein one or more additional wires that do not deliver electrical current to said electrical load during normal operation connect between said plug and said electrical load.

11. The electrical shock protection apparatus of claim 1 wherein said bidirectional electrical current blocking means prevents electrical current flow when a magnitude of voltage across said bidirectional electrical current blocking means is below a predetermined threshold and wherein said bidirectional electrical current blocking means triggers to allow electrical current flow when the magnitude of the voltage across said bidirectional electrical current blocking means exceeds said threshold.

12. The electrical shock protection apparatus of claim 1 wherein:

while a fault is absent, a charge storage capacitor is charged to a voltage sufficient to trigger a first switch which allows flow of electrical current to said electrical load; and while a fault is present, said charge storage capacitor is forced to be in a discharged condition thus preventing triggering of said first switch and preventing flow of electrical current to said electrical load.

13. The electric shock protection apparatus of claim 12 wherein, while a fault is present, current through a resistance bridge turns on a second switch to force said charge storage capacitor to remain in a discharged condition.

14. The electric shock protection apparatus of claim 13 wherein said first switch comprises a triac and said second switch comprises a Darlington transistor.

15. An electrical shock protection method for an alternating current electrical appliance comprising an electrical load and two electrical current carrying conductors connecting the electrical load to a power source; the electrical shock protection method comprising the steps of:

a) bidirectionally blocking electrical current flow through the two electrical current carrying conductors to the electrical load for predetermined time intervals;

b) detecting electrical current flow in the two electrical current carrying conductors; and c) interrupting electrical current flow in the two electrical current carrying conductors if an appreciable current in one of the two conductors is detected during the predetermined time intervals, the appreciable current being indicative of a potentially dangerous electrical fault.

16. The electrical shock protection method of claim 15 wherein steps a), b), and c) are all performed within a plug.

17. The electrical shock protection method of claim 16 additionally comprising the step of detecting a fault selected from the group consisting of load to ground faults and of hot to ground faults and neutral to ground faults in an electrical current carrying conductor.

18. The electrical shock protection method of claim 16 wherein steps a), b), and c) are all performed within a non-polarized plug.

19. The electrical shock protection method of claim 15 additionally comprising the step of shutting off flow of current to the electrical load by imposing an artificial fault condition via a low current switch means.

20. The electrical shock protection method of claim 15 additionally comprising the step of communicating to a remote controller information selected from the group consisting of presence of a fault condition, absence of a fault condition, appliance identification information, and appliance status information.

21. The electrical shock protection method of claim 15 wherein the blocking step comprises blocking via means selected from the group consisting of diac controlled thyristors, transformer coupled thyristors, transistor controlled thyristors and optocoupled thyristors.

22. The electrical shock protection method of claim 15 wherein the blocking step comprises the steps of preventing electrical current flow when a magnitude of voltage of the power source is below a predetermined threshold and triggering to allow electrical current flow when the magnitude of voltage of the power source exceeds the threshold.

23. The electrical shock protection method of claim 15 wherein the alternating current electrical appliance consists essentially of an electrical load and two electrical current carrying conductors connecting the electrical load to a power source.

24. The electrical shock protection method of claim 23 wherein one or more additional wires that do not deliver electrical current to the electrical load during normal operation connect between the plug and the electrical load.

25. The electrical shock protection method of claim 15 wherein the blocking step comprises the steps of impeding electrical current flow when a magnitude of voltage across a bidirectional electrical current blocking means is below a predetermined threshold and triggering to allow electrical current flow when the magnitude of the voltage across the bidirectional electrical current blocking means exceeds the threshold.

26. The electrical shock protection method of claim 15 additionally comprising the steps of:

d) while a fault is absent, charging a charge storage capacitor to a voltage sufficient to trigger a first switch which allows flow of electrical current to the electrical load; and e) while a fault is present, forcing the charge storage capacitor to be in a discharged condition thus preventing triggering of the first switch and preventing flow of electrical current to the electrical load.

27. The electric shock protection method of claim 26 additionally comprising the step of, while a fault is present, turning on a second switch via current through a resistance bridge to force the charge storage capacitor to remain in a discharged condition.

28. The electric shock protection method of claim 27 wherein the first switch comprises a triac and the second switch comprises a Darlington transistor.

* * * * *